(12) United States Patent
Xu et al.

(10) Patent No.: US 11,624,688 B2
(45) Date of Patent: Apr. 11, 2023

(54) TESTING DEVICE FOR MEASURING INTERFACIAL SHEAR PROPERTIES BETWEEN FIBERS AND MEDIA

(71) Applicant: Jilin Jianzhu University, Changchun (CN)

(72) Inventors: Lina Xu, Changchun (CN); Lei Niu, Changchun (CN); Yujie Jin, Changchun (CN); Yongmei Qian, Changchun (CN); Wei Tian, Changchun (CN); Ning Liu, Changchun (CN)

(73) Assignee: Jilin Jianzhu University, Changchun (CN)

( * ) Notice: Subject to any disclaimer, the term of this patent is extended or adjusted under 35 U.S.C. 154(b) by 0 days.

(21) Appl. No.: 17/889,146

(22) Filed: Aug. 16, 2022

(65) Prior Publication Data
US 2023/0058391 A1    Feb. 23, 2023

(30) Foreign Application Priority Data
Aug. 23, 2021 (CN) .......................... 202110969693.5

(51) Int. Cl.
*G01N 3/24* (2006.01)
*G01N 3/02* (2006.01)

(52) U.S. Cl.
CPC .................. *G01N 3/24* (2013.01); *G01N 3/02* (2013.01); *G01N 2203/0025* (2013.01)

(58) Field of Classification Search
CPC .......... G01N 17/00; G01N 1/286; G01N 1/28; G01N 3/08; G01N 3/12; G01N 3/24;
(Continued)

(56) References Cited

U.S. PATENT DOCUMENTS 4,909,085 A    3/1990  Hardy et al.
5,361,641 A *  11/1994 Eldridge ................ G01N 19/04
                                                    73/842

(Continued)

FOREIGN PATENT DOCUMENTS

CN    101706397 A    5/2010
CN    104007025 A    8/2014
(Continued)

OTHER PUBLICATIONS

First Office Action issued in counterpart Chinese Patent Application No. 202110969693.5, dated Apr. 2, 2022.

*Primary Examiner* — Brandi N Hopkins
(74) *Attorney, Agent, or Firm* — Westbridge IP LLC

(57) ABSTRACT

Disclosed is a testing device for measuring interfacial shear properties between fibers and media, including a main body, which is a rectangular plate-like structure with L-shaped plates provided at the bottom ends of the main body, a connecting rod provided at a top right of the main body, a groove provided at the top of the main body; and four rotating grooves are provided inside the groove. The rotating grooves are cylindrical structures with raised centers at both ends; and a mounting piece is installed above the left end of the main body; a magnet of a displacement micrometer is connected to a tension trolley, a high-definition camera is turned on, weights are added into a loading bucket and the fiber movement is observed until the fiber is pulled out or sliding friction occurs, and then the camera is stopped and accurate data is tested.

9 Claims, 8 Drawing Sheets

(58) Field of Classification Search
CPC .......... G01N 19/04; G01N 1/36; G01N 33/00; B32B 27/04; E04G 23/0218; G01B 15/00; E04C 3/29; C08K 3/04; Y02A 30/30; Y02E 10/72; E02D 33/00; G01M 5/005; G01M 7/022; B23B 29/022; G01R 31/2648; G01R 1/07357; H01M 8/247
See application file for complete search history.

(56) References Cited

U.S. PATENT DOCUMENTS

| | | | | |
|---|---|---|---|---|
| 5,546,797 | A * | 8/1996 | Dutta | G01N 19/04 |
| | | | | 73/866 |
| 5,887,638 | A * | 3/1999 | Yoritsune | B22C 9/02 |
| | | | | 73/78 |
| 7,275,423 | B2 * | 10/2007 | Hicks | G01N 3/46 |
| | | | | 73/104 |
| 2021/0003490 | A1 | 1/2021 | Zhao et al. | |
| 2021/0033522 | A1 | 2/2021 | Mukhtar | |

FOREIGN PATENT DOCUMENTS

| | | |
|---|---|---|
| CN | 205449703 U | 8/2016 |
| CN | 110361268 A | 10/2019 |
| CN | 209745692 U | 12/2019 |
| CN | 111487134 A | 8/2020 |
| CN | 111993205 A | 11/2020 |
| CN | 112161880 A | 1/2021 |
| CN | 112213259 A | 1/2021 |
| CN | 112857984 A | 5/2021 |
| CN | 213875389 U | 8/2021 |
| JP | H11153596 A | 6/1999 |
| JP | 2015045611 A | 3/2015 |

\* cited by examiner

TESTING DEVICE FOR MEASURING INTERFACIAL SHEAR PROPERTIES BETWEEN FIBERS AND MEDIA

CROSS-REFERENCE TO RELATED APPLICATIONS

This application claims priority to Chinese Patent Application No. 202110969693.5, filed on Aug. 23, 2021, the contents of which are hereby incorporated by reference.

TECHNICAL FIELD

The application belongs to the technical field of testing devices, and in particular to a testing device for measuring interfacial shear properties between fibers and media.

BACKGROUND

Testing devices are often required for measuring the shear properties of different types of fibers at interfaces with different media to obtain accurate test data.

Chinese Patent Application Publication CN 112161880 A provides a testing device for measuring shear performance, including components of a clamp, connecting joints and loading joints, where the clamp is detachably connected with an edge of a testing piece, and loads are applied along a first diagonal of the testing piece through the clamp, two corners corresponding to the first diagonal are both provided with the connecting joints and the loading joints, one end of the connecting joint is hinged with the clamp, the other end of the connecting joint is hinged with the loading joint, and the loading joint is hinged with the testing piece. According to the testing device, the connecting joint is hinged with the connecting joint and the clamp; clear load transfer as well as nearly pure shear testing loads are provided for the testing piece to achieve test loading of high precision.

The existing testing devices for measuring the shear performance of the interface between fibers and media fail to test the effect of anchoring force, anchoring length and anchoring area on the shear performance of the interface between fibers and media of different materials and media during application, as well as to record data throughout the application; moreover, these devices are not adjustable in terms of height so as to adapt to a wide range of testing schemes with different requirements.

SUMMARY

In view of solving the above technical problems, the present application provides a testing device for measuring interfacial shear properties between fibers and media, so as to solve the problems that the existing testing device for measuring the shear performance of the interface between fibers and media fails to test the influence of the anchoring force, anchoring length and anchoring area on the shear performance of the interface between different fibers and media, and fails to record full data during the whole process, as well as the problems that the existing testing device is not convenient in adjusting height and therefore cannot adapt to various testing schemes with different requirements of heights.

The objectives and efficacy of the testing device provided by the present application are achieved by the following specific technical schemes:

a testing device for measuring interfacial shear properties between fibers and media includes:

a main body, where the main body is in a structure of rectangular plate with L-shaped plates provided at two ends of its bottom, a connecting rod arranged on a right side of a top of the main body, as well as a groove opened on the top of the main body; four cylindrical rotating grooves with raised centers at both ends are arranged inside the groove;

a mounting piece, where the mounting piece in a rectangular structure arranged above a left end of the main body, the mounting piece is connected in the middle by four rectangular rods, the top of the mounting piece is provided with a T-shaped groove as well as four rectangular grooves, and the internal top of the mounting piece is fixed with a jack; and a fixing plate, where the fixing plate is in a rectangular plate structure arranged above a left end of the main body.

Optionally, the main body includes a supporting plate of a rectangular plate structure, where a rectangular groove is provided inside the supporting plate, two triangular support plates are provided on both sides of a left end of the supporting plate, a displacement micrometer is mounted on a right side of the supporting plate, and a bracket is provided on a side edge of the displacement micrometer as well as a magnet; the main body includes L-shaped installation grooves arranged on both sides of the groove of the main body; the main body also includes six guiding rods, where the guiding rods have a cylindrical structure and are installed at both sides of the groove of the main body; the main body includes adjusting rods of a cylindrical structure with two convex ends in the middle, where the adjusting rods are each provided with a controlling rod at a bottom and thread on an outer side of a top, and the adjusting rod is installed in the rotating groove of the groove; the main body also includes a moving plate with a rectangular plate structure, a top of which is provided with a T-shaped block, where the T-shaped block is coated with lubricating oil; two sides of the moving plate are provided with six round holes, where guiding rods are inserted into the round holes; two sides of the moving plate are provided with four threaded holes, and tops of the adjusting rods are inserted into the threaded holes; the main body includes a tension trolley with rectangular structure, the tension trolley is provided with a T-shaped groove on a bottom and the inside of the T-shaped groove is inserted with the T-shaped block of the moving plate; a side edge of the tension trolley is connected with the magnet of the displacement micrometer, a top left side of the tension trolley is provided with a tension meter, the tension meter is provided with a clamping block on its upper right side, a traction rope is fixed inside the clamping block and is connected with a loading bucket on its right end; the main body also includes a bracket of U-shaped structure, with wedge-shaped blocks arranged at both sides of a bottom of both ends of the bracket, the L-shaped plates are arranged at a bottom of both ends of the bracket and are inserted into the installation grooves; the main body further includes a high-definition camera fixed at a middle of the bottom of the bracket.

Optionally, the mounting piece includes a positioning groove with a T-shaped structure, where the positioning groove has two front ends of inclined structures; the mounting piece includes L-shaped connecting plates arranged at both sides of right end of the mounting piece, where the L-shaped connecting plates are inserted with top ends of the supporting plates; the pressurizing mechanism includes a T-shaped storage piece, where the storage piece has a rectangular structure on its inner top, a through groove provided at middle position on its right side, and a bottom of the storage piece is inserted into the positioning groove;

the mounting piece includes a pushing piece of a rectangular structure, where the inside of the pushing piece is connected by four rectangular rods, and the four rectangular rods are inserted into four rectangular grooves at the top of the mounting piece, the pushing piece is provided a T-shaped groove on its inner top, and a rectangular groove on the top of the T-shaped groove; the mounting piece also includes an inserter, where the inserter has a T-shaped bottom that inserted into the T-shaped groove at the top of the mounting piece, and a top of cylindrical structure with a bulge in the middle, the inserter is sheathed with a spring on its outer side; the mounting piece is also provided with a T-shaped inserting plate, where a round hole is arranged in the middle of the inserting plate, the top of the inserter is inserted into the round hole, and the inserting plate is embedded in the T-shaped groove of the pushing piece.

Optionally, the fixing plate includes a supporting block with a rectangular structure, where the supporting block is provided with rectangular groove on its top and the supporting block is arranged at the top of the fixing plate; the fixing plate includes a guiding piece of a rectangular structure, a rectangular groove is arranged inside the guiding piece, and the guiding piece is obliquely fixed on both sides above the right end of the supporting block; the fixing plate also includes a moving rod with a cylindrical structure, both ends of the moving rod are provided with two circular plates, two outer ends of the moving rod are equipped with springs, and the outer ends of the moving rod are inserted inside the rectangular grooves of the guiding pieces; the fixing plate further includes contacting pieces, where the contacting pieces have a ring-shaped structure and are made of rubber, the contacting pieces are sleeved at both ends of the moving rod, and the contacting pieces are in contact with the inner ends of the springs on the outer sides; the fixing plate also includes a guiding wheel, where the guiding wheel is provided with a round hole on its inside, the inside of the round hole is inserted with the moving rod, the groove is provided on the outer side of the guiding wheel, and the traction rope is embedded in the inner part of the groove.

Compared with the prior art, the present application has the following beneficial effects.

The present testing device is provided with mounting piece arranged above the right end of the main body, where different test media may be added into the storage piece when the device is being used, including cement soil, concrete or soil, and the fibers may be located inside the media; the jack is operated to push the pushing piece to move inside the storage piece, then the jack load, the number of loads and the consolidation duration and so on are determined according to specific requirements; then, the clamp of the tension meter is controlled to be connected with the exposed fiber, and the magnet of the displacement micrometer is connected with the tension trolley, then the high-definition camera is initiated to record; a weight is then added inside the loading bucket, where the movement of the fiber is observed; the camera is stopped recording until the fiber is pulled out or generates sliding friction, accurate data of interface shear performance affected by anchoring force, anchoring length and anchoring area of the fiber in different material media are obtained;

The present testing device is also provided with fixing plate installed above the right end of the main body, which makes the present device when in use may be adjusted in terms of height, where the height is adjusted by the guiding wheel driven by the moving rod; the accuracy of the test data is assured by controlling the clamp at the front end of the tension trolley in a consistent direction of axial direction of the fibers as well as the axial direction of the traction rope; moreover, the guiding wheel can adjust its position for use and directly control the movable rod to move up and down when the height needs to be adjusted; after the position adjustment is finished, the springs automatically drive the contacting pieces to make the inner side of the contact piece contact with the outer side of the guiding piece in an anti-skid manner, therefore realizing convenient fixing and convenient and efficient position adjustment.

DETAILED DESCRIPTION OF THE EMBODIMENTS

Figure 1:
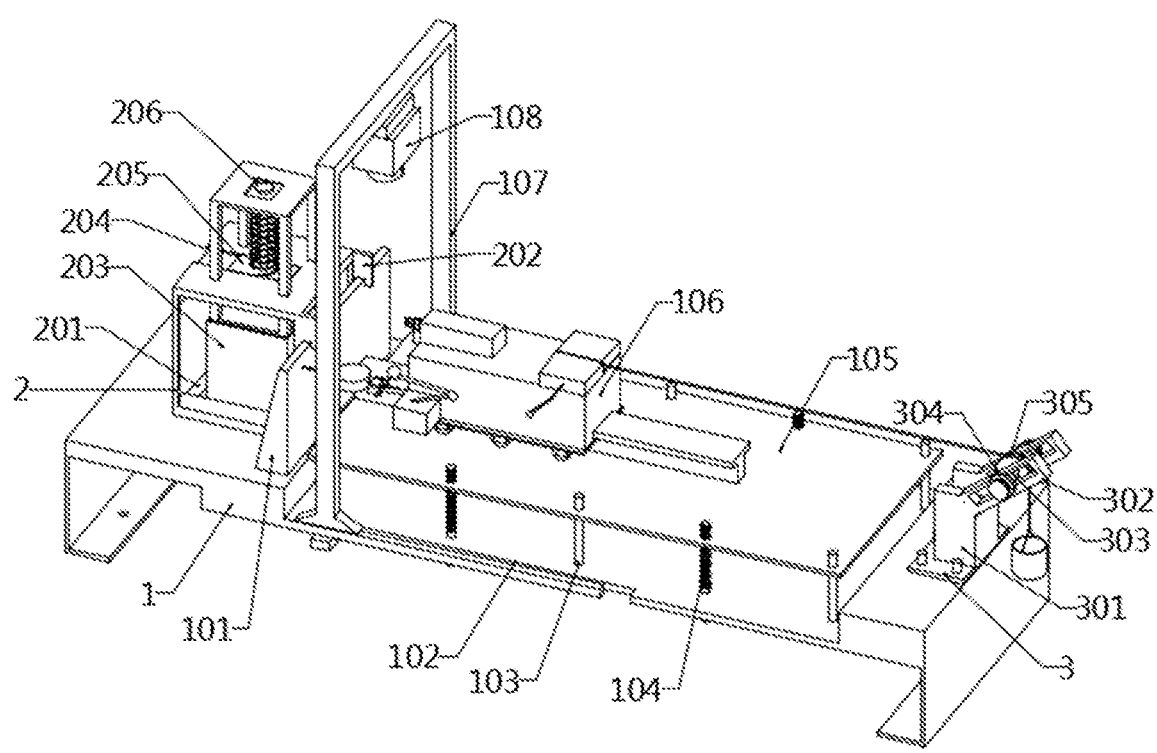
FIG. 1 shows a three-dimensional structure of the present application.
Figure 2:
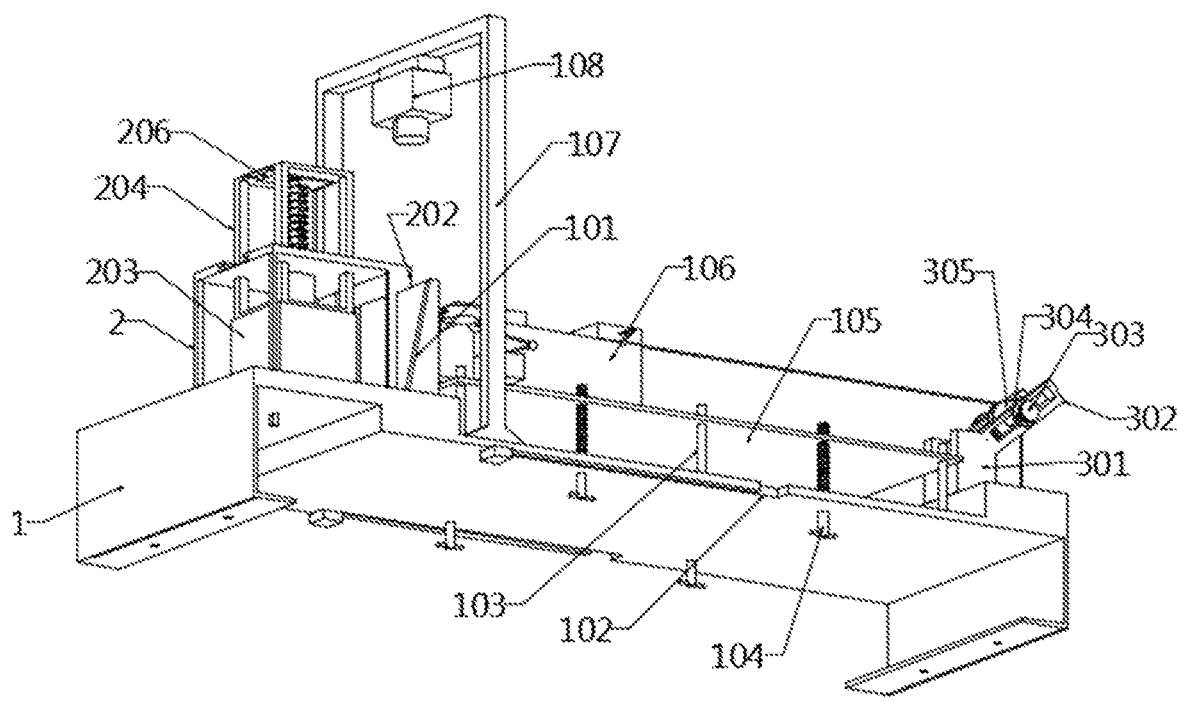
FIG. 2 shows a bottom structure of the present application.
Figure 3:
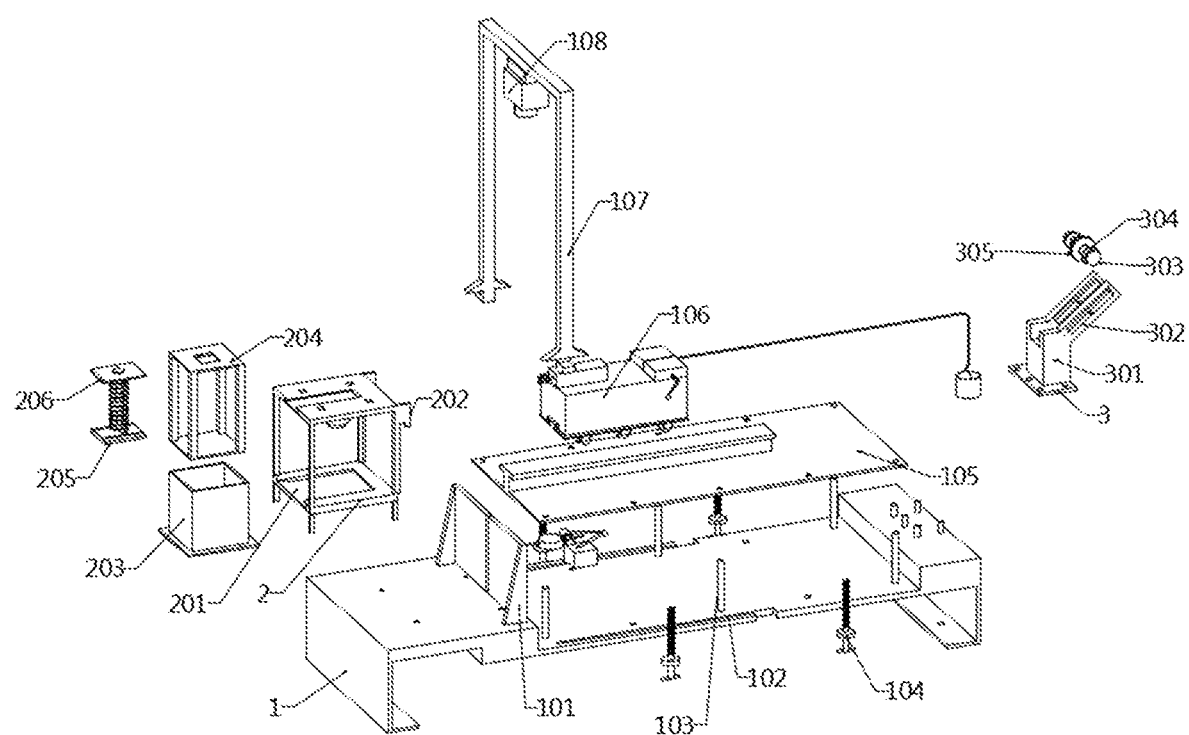
FIG. 3 shows a schematic diagram of the decomposed three-dimensional structure of the present application.
Figure 4:
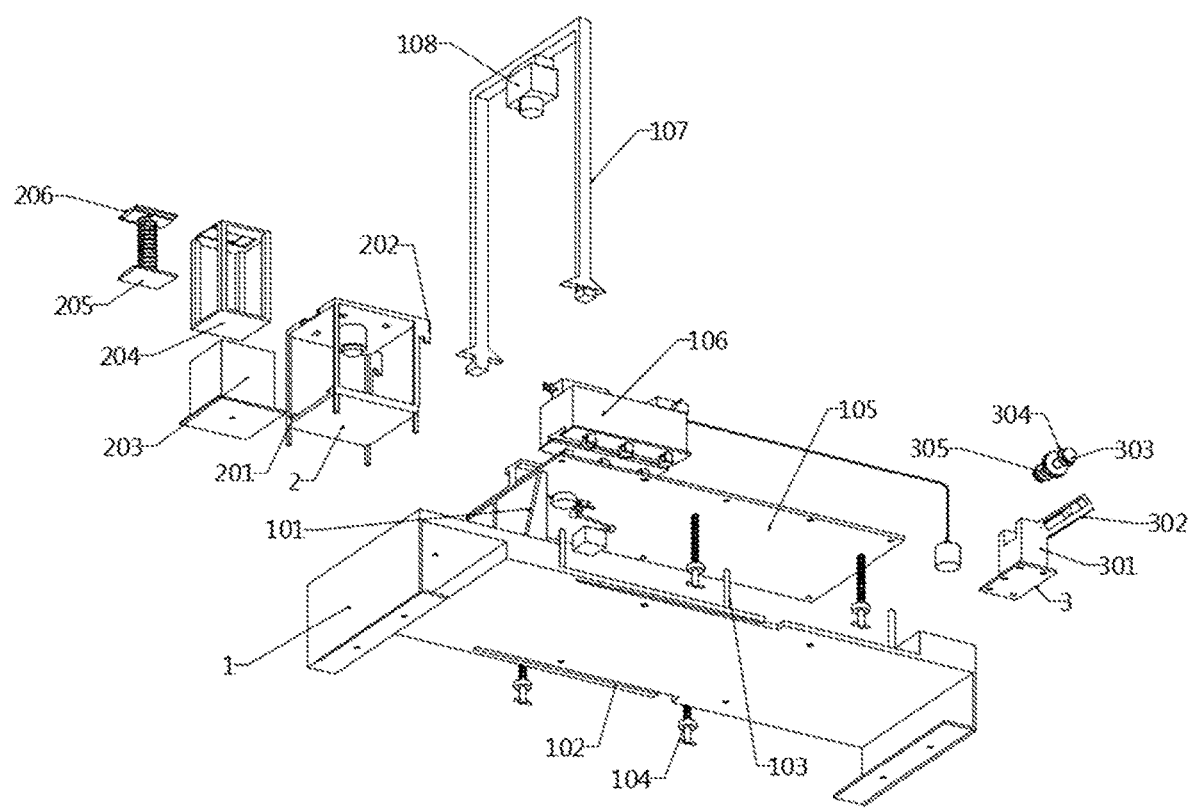
FIG. 4 shows a schematic diagram of the upward view of the decomposed structure of the present application.

The present application is described hereinafter in further detail with reference to the accompanying drawings and embodiments, where the embodiments described hereinafter are used to illustrate the application, but are not intended to limit the scope of the application.

In the description of the present application, unless otherwise specified, "plurality" means two or more; the terms "top", "bottom", "left", "right", "inside", "outside", "front end", "rear end", "head", "back end", and the like indicate orientation or positional relationships based on the orientation or positional relationships shown in the accompanying drawings and are intended only to facilitate and simplify the description of the application, rather than indicating or implying that the device or element referred to must have a particular orientation, be constructed and operate in a particular orientation, it is not to be construed as a limitation of the application. Furthermore, the terms "first", "second", "third", etc. are used for descriptive purposes only and are not to be construed as indicating or implying relative importance.

In the description of the present application, it should be noted that unless otherwise specified and limited, the terms "connected" and "communicated" should be understood broadly, for example, as fixed, detachable, or integrally connected; mechanically connected or electrically connected; directly connected or indirectly connected through an intermediate medium. For those of ordinary skill in the art, the specific meanings of the above terms in the present application can be understood in specific situations.

Embodiment

As shown in FIGS. 1-8, a testing device for measuring interfacial shear properties between fibers and media is provided, including a main body 1, where the main body 1 is in a structure of rectangular plate with L-shaped plates provided at two ends of its bottom, a connecting rod is arranged on a right side of a top of the main body 1, a groove is arranged on the top of the main body 1, four rotating grooves are arranged inside the groove, the rotating grooves are of cylindrical structures with bulges at middle of the two ends, a mounting piece 2 is arranged above a left end of the main body 1; a fixing plate 3 is inserted on a top right side of the main body 1 through a round rod; a pressurizing mechanism is installed inside the mounting piece 2; the mounting piece 2 is in a rectangular structure and works to control the contact between different media and fibers, the mounting piece 2 is connected in the middle by four rectangular rods, a T-shaped groove as well as four rectangular grooves are provided on a top end of the mounting piece 2, and a jack is fixedly provided at an inner top of the mounting piece 2; the fixing plate 3 serves to control moving rod 303 and a guiding wheel 305 to move up and down so as to adjust the position and thus ensure the accuracy of the test data.

Figure 5:
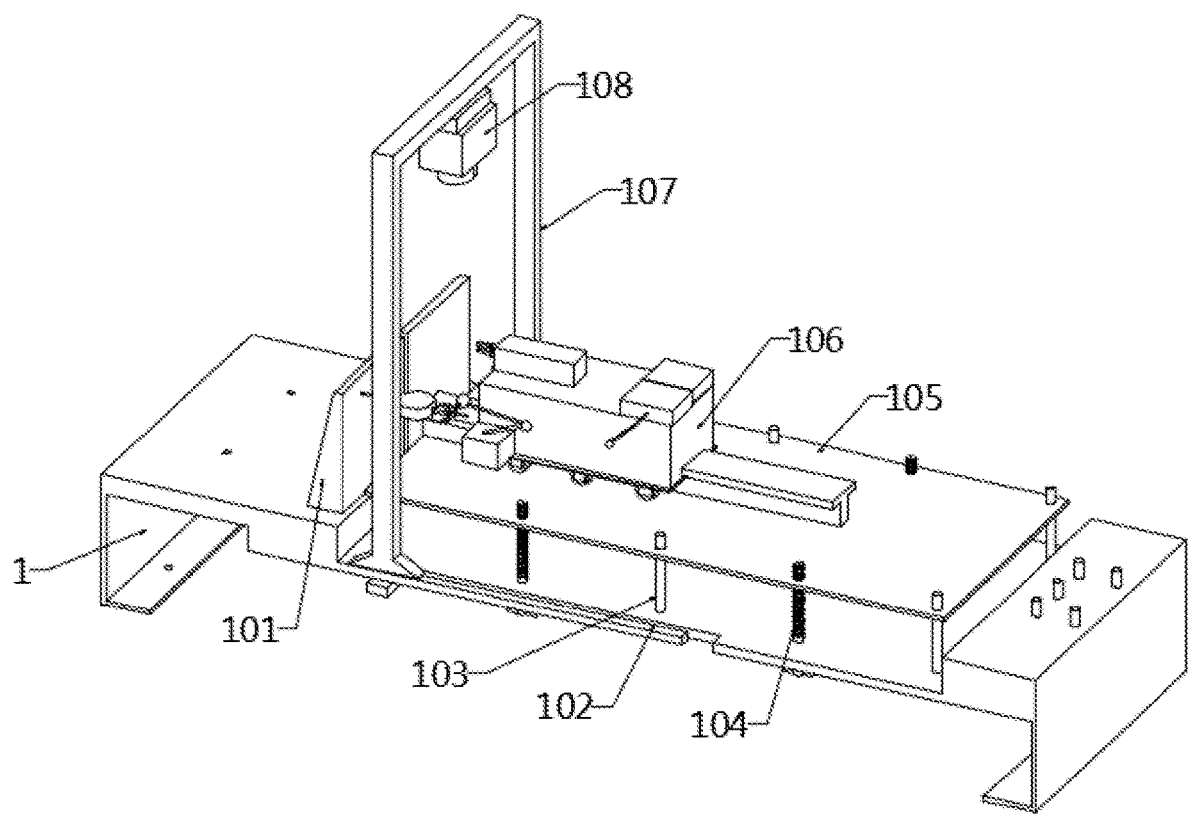
FIG. 5 shows a schematic diagram of the three-dimensional structure of the main body of the present application.

As shown in FIG. 5, the main body includes a supporting plate 101 of a rectangular plate structure, where a rectangular groove is provided inside the supporting plate 101, two triangular support plates are provided on both sides of a left end of the supporting plate 101, a displacement micrometer is mounted on a right side of the supporting plate 101, and a bracket 107 is provided on a side edge of the displacement micrometer as well as a magnet, the supporting plate 101 serves as an auxiliary installation for the displacement micrometer; the main body 1 includes L-shaped installation grooves 102 arranged on both sides of the groove of the main body 1, where the installation grooves 102 are used to mount the bracket 107, so that the bracket 107 can be easily mounted and the position can be easily adjusted after installation; the main body 1 also includes six guiding rods 103, the guiding rods 103 have a cylindrical structure and are installed at both sides of the groove of the main body 1, where the guiding rods 103 serve as a connection to a moving plate 105, which in turn allows the moving plate 105 to be guided to move; the main body includes adjusting rods 104 of a cylindrical structure with two convex ends in the middle, the adjusting rods are each provided with a controlling rod at a bottom and are thread on an outer side of a top, and the adjusting rod 104 is installed in the rotating groove of the groove, where the adjusting rod 104 works to control the rotation by human power, which in turn controls the movement of the moving plate 105 up and down by threads.

Figure 7:
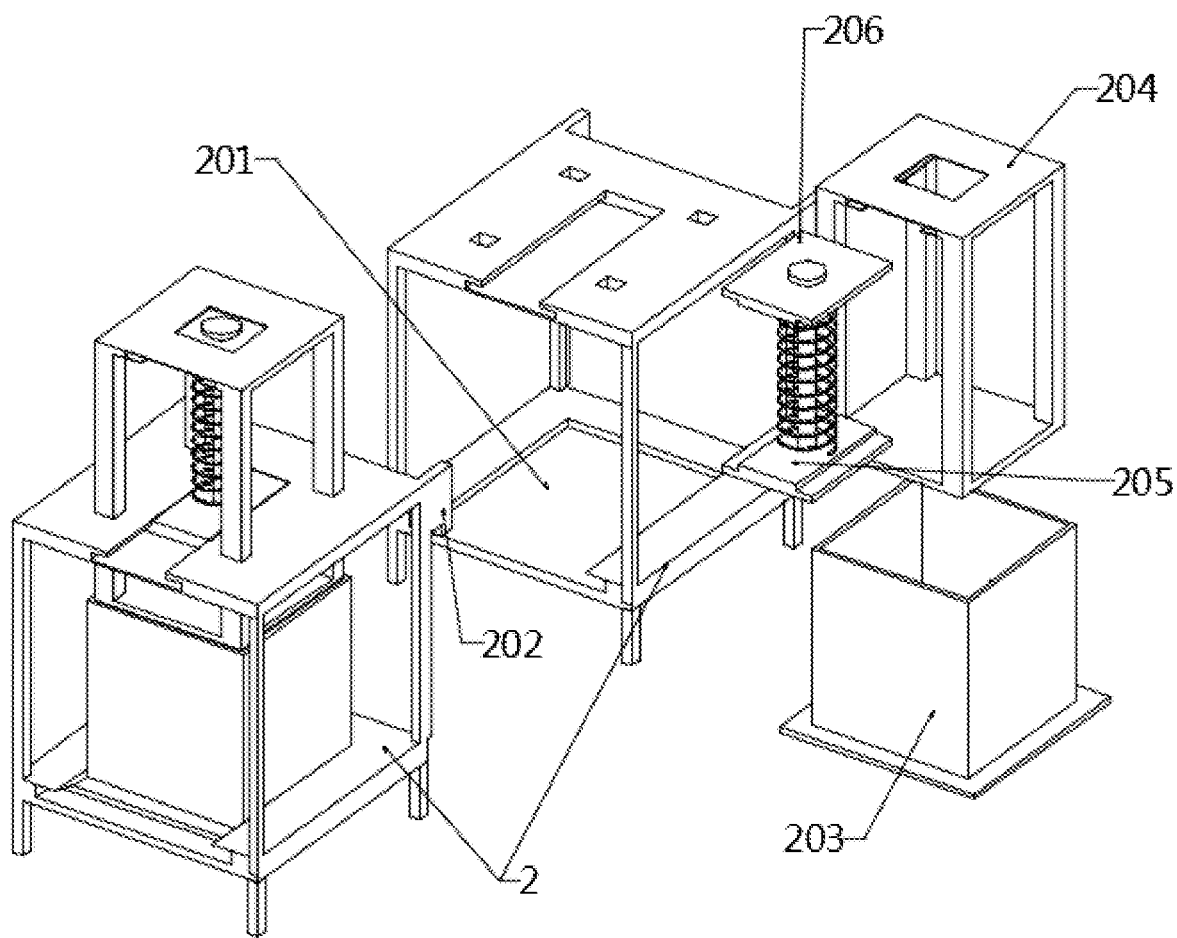
FIG. 7 shows a schematic diagram of the decomposed three-dimensional structure of the mounting piece of the present application.

As shown in the FIG. 7, the mounting piece 2 includes a positioning groove 201 with a T-shaped structure, the positioning groove 201 has two front ends of inclined structures, and the positioning groove 201 serves to install the bottom of the storage piece 203, which in turn allows the storage piece 203 to be positioned and installed, and thus accurately located at the bottom of the pushing piece 204; the mounting piece 2 includes L-shaped connecting plates 202 arranged at both sides of right end of the mounting piece 2, and the L-shaped connecting plates 202 are inserted with top ends of the supporting plates 101, where the connecting plates 202 play the role of connecting with the supporting plates 101, and thus provide a stable connection with the supporting plates 101 after installation, resulting in a rather secure application; the pressurizing mechanism includes a T-shaped storage piece 203, where the storage piece 203 has a rectangular structure on its inner top, and the storage piece 203 serves to add fibers as well as different media and thus conduct experiments through different media; a through groove is provided at middle position on the right side of the storage piece 203, and the bottom of the storage piece 203 is inserted into the positioning groove 201; the mounting piece 2 includes a pushing piece 204 of a rectangular structure, where the inside of the pushing piece 204 is connected by four rectangular rods, and the four rectangular rods are inserted into four rectangular grooves at the top of the mounting piece 2; the pushing piece 204 enables the movement of the storage piece 203 by receiving jacking power, which in turn compresses the media to different degrees and thus allows the testing of different data; the pushing piece 204 is provided with a T-shaped groove on its inner top, and a rectangular groove on the top of the T-shaped groove; the mounting piece 2 also includes an inserter 205, where the inserter 205 has a T-shaped bottom that inserted into the T-shaped groove at the top of the mounting piece 2, and a top of cylindrical structure with a bulge in the middle, the inserter 205 is sheathed with a spring on its outer top side, the inserter 205 is installed with a inserting plate 206, so that after the pushing piece 204 stops pushing, the spring can be retracted and the pushing piece 204 can be reset accordingly; the inserting plate 206 is T-shaped with a round hole arranged in the middle, where the round hole is inserted with the top of the inserter 205, and the inserting plate 206 is embedded in the T-shaped groove of the pushing piece 204.

Figure 8:
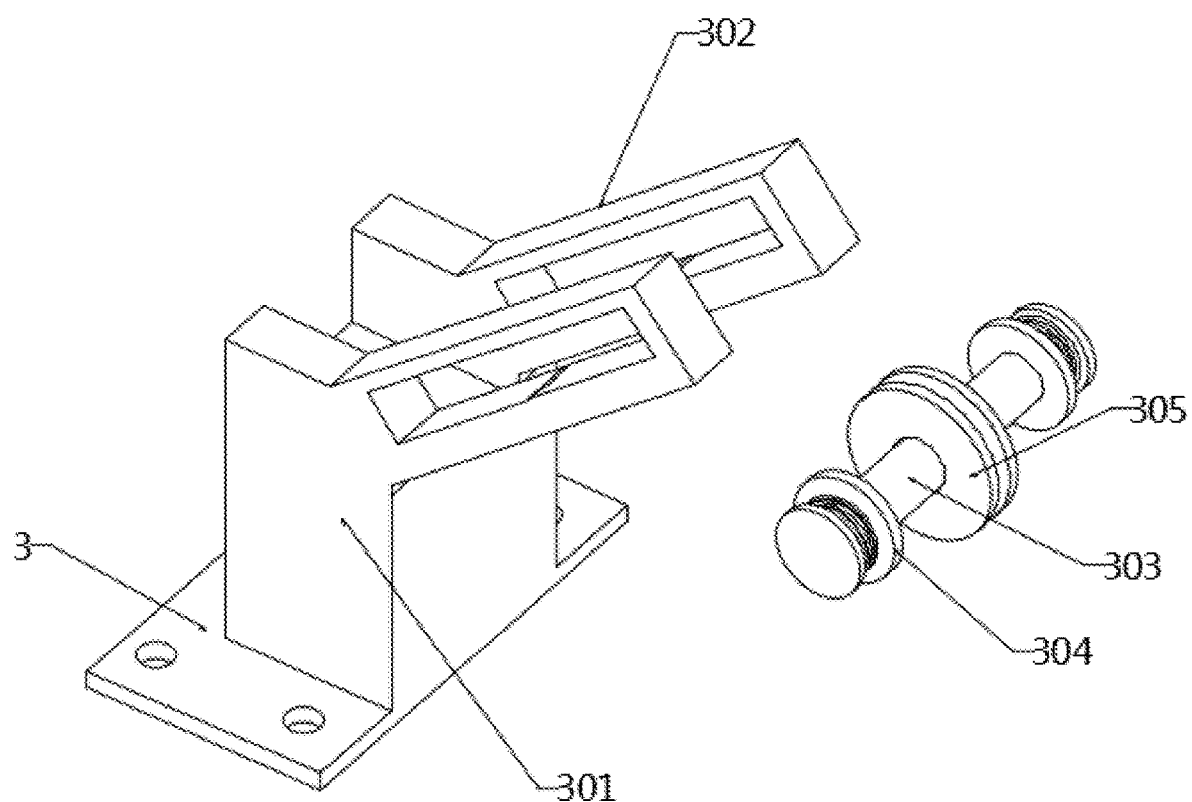
FIG. 8 shows a schematic diagram of the decomposed three-dimensional structure of the fixing plate of the present application.

As shown in the FIG. 8, the fixing plate 3 includes: supporting block 301, a guiding piece 302, moving rod 303, contacting piece 304 and guiding wheel 305; the supporting block 301 is in a rectangular structure with rectangular groove provided on its top, the supporting block 301 is arranged at the top of the fixing plate 3 and plays the role of supporting; the guiding piece 302 is in a rectangular structure with rectangular groove arranged inside, the guiding piece 302 is obliquely fixed on both sides above the right end of the supporting block 301, and the guiding piece 302 controls the guiding movement of the moving rod 303 by means of the rectangular groove, so that the moving rod 303 can be guided to move; the moving rod 303 is in a cylindrical structure with both ends provided with two circular plates and two outer ends equipped with springs, where the outer ends of the moving rod 303 are inserted into the rectangular grooves of the guiding pieces 302; the contacting pieces have a ring-shaped structure and are made of rubber, the contacting pieces 304 are sleeved at both ends of the moving rod and contact with the inner side of the spring on the outer side, the contacting pieces 304 receive the spring power displacement, which in turn contacts the side of the guiding piece 302, so that the moving rod 303 can be conveniently limited and fixed after adjusting its position; the guiding wheel 305 is provided with a round hole on its inside, the inside of the round hole is inserted with the moving rod 303, the guiding wheel 305 is provided with groove on the outer side, and a traction rope is embedded in the inner part of the groove, where the guiding wheel 305 contacts with the traction rope to enable the traction rope to be guided, which in turn enables the traction rope to be pulled more smoothly.

Figure 6:
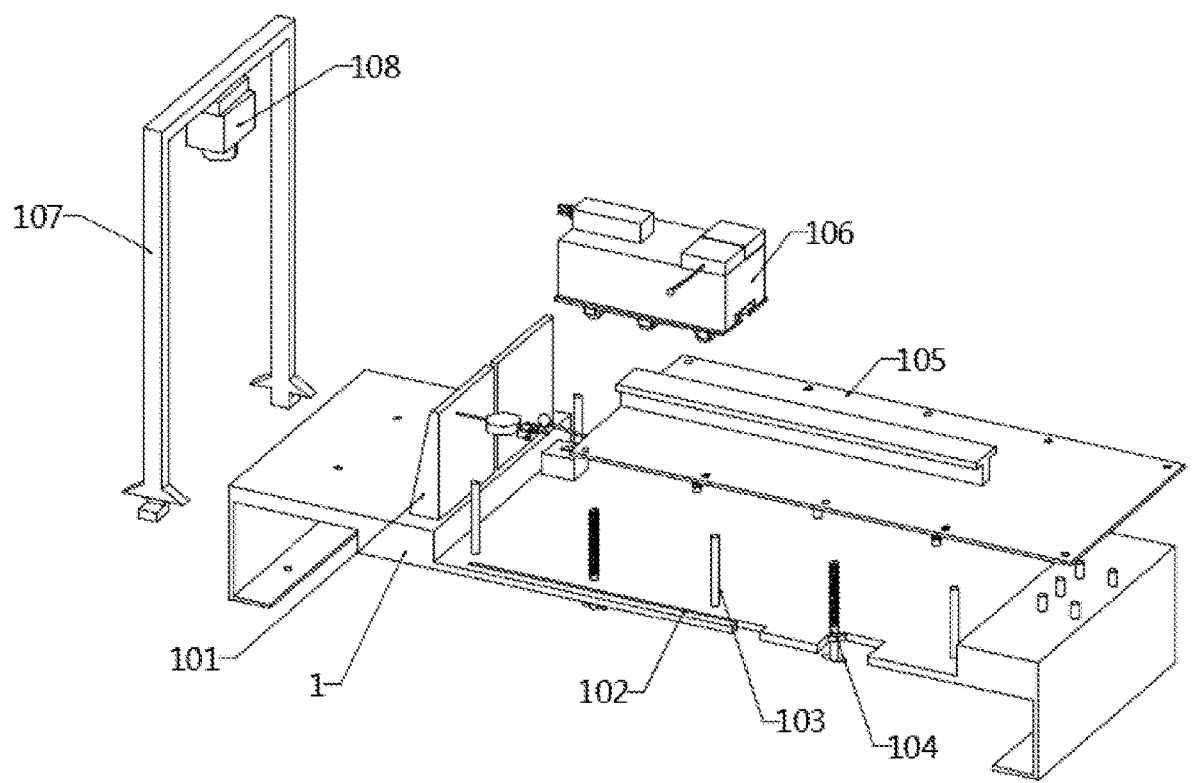
FIG. 6 shows a schematic diagram of the decomposed three-dimensional structure of the main body of the present application.

As shown in FIG. 6, the main body 1 also includes a moving plate 105, a tension trolley 106, a bracket 107 and a high-definition camera 108; the moving plate 105 is in a rectangular plate structure with a T-shaped block provided on its top, where the T-shaped block is coated with lubricating oil; two sides of the moving plate 105 are provided with six round holes inserted with the guiding rods 103; two sides of the moving plate 105 are also provided with four threaded holes inserted with the tops of the adjusting rods 104; the tension trolley 106 is in a rectangular structure with a T-shaped groove provided on its bottom, where the T-shaped groove is inserted with the T-shaped block of the moving plate 105, the tension trolley 106 is connected with the magnet of the displacement micrometer on its side edge, and provided with a tension meter on its left top side, and the tension meter has clamp on its side; the tension trolley 106 is provided with a clamping block on its upper right side, a traction rope is fixed inside the clamping block and is connected with a loading bucket on the right end of the traction rope; the moving plate 105 moves up and down, and in turn drives the tension trolley 106 to displace together, so that the clamp at the front of the tension trolley 106 are in the same direction as the axis of the fibers; the tension trolley 106 connects the fibers and the clamp, and also connects the traction rope with the clamping block, so that after pulling the traction rope, the tension trolley 106 is capable of pulling the tension meter as well as the displacement micrometer, which in turn yields accurate data; the bracket 107 is of U-shaped structure with wedge-shaped blocks as well as L-shaped plates arranged at both sides of the bottom of both ends, where the L-shaped plates are inserted into the installation grooves; the high-definition camera 108 is fixed at the middle of the bottom of the bracket 107; the bracket 107 is amounted easily and drives the high-definition camera 108 to move along conveniently, and the high-definition camera 108 serves the purpose of recording the test data.

As another implementation of the embodiment of the present application, the inserter 205 and the inserting piece 206 may be manually taken out so as to enable the pushing piece 204 to be displaced by the jack.

During application, the present device is manually controlled to install the mounting piece 2 onto the main body 1, followed by installing the fixing plate on the right end of the main body 1, then the tension trolley 106 is controlled to connect with the moving plate 105 where the T-shaped block of moving plate 105 is inserted into the T-shaped groove of the tension trolley 106; then the moving plate 105 is controlled to connect with the guiding rod 103 as well as the adjusting rod 104 so as to fix the main body 1 onto the test table; fibers are then placed at appropriate locations and then covered with the test material, and the storage piece 203 is installed, where the bottom of the storage piece 203 can be inserted into the positioning groove 201 so as to ensure an accurate installation of the storage piece 203; then the jack inside the mounting piece 2 is initiated followed by determination of the loading of the jack, loading grades as well as the consolidation duration; then the traction rope is manually controlled to through the guiding wheel 305 and the left end of the traction rope is fixed with the clamping block of the tension trolley 106; the moving plate 105 is adjusted according to the position of fibers, where the adjusting rod 104 is controlled to rotate firstly so as to guide the moving plate 105 dislocate through the guiding rod 103, the clamp in the front of the tension trolley is oriented in the same direction as the axis of the fibers, then the moving rod 303 is controlled to adjust position so as to enable the traction rope can be adjusted in terms of height; after the position adjustment, the springs drive the contacting piece 304 to dislocate so as to in contact with the side edge of the guiding piece 302, thus achieving the limitation and fixing so that the traction rope is in the same direction as the axis of the fibers; then the clamp of the tension meter is controlled to clamp the fibers out of the mold, and then the magnet block of the displacement micrometer is controlled to connect with the tension trolley 106 by adsorption to ensure that there is no relative displacement between the two during the test, thus ensuring the test accuracy; then the bracket 107 is controlled to drive the installation of the high-definition camera 108 so that the L-shaped plate at the bottom of the bracket 107 can be inserted into the interior of the installation groove 102, and then the movement is controlled, while the high-definition camera 108 can be driven to adjust the video position so that the high-definition camera 108 can clearly capture the readings of the tension meter and displacement micrometer; the initial displacement is recorded before the recording, then the weight is slowly added into the loading bucket, where the weight is made of scene-making Black Galaxy granite; the fiber movement is then observed and the recording is stopped until the fiber is pulled out or sliding friction is generated, thus completing the test process, while the test data is recorded in detail by the high-definition camera 108.

The embodiments of the application are given for purposes of illustration and description and are not intended to be omission-free or to limit the application to the disclosed form. Many modifications and variations will be apparent to those of ordinary skill in the art. The embodiments are selected and described to better illustrate the principles and practical applications of the application and to enable one of ordinary skill in the art to understand the application and thereby design various embodiments with various modifications suitable for particular uses.

What is claimed is:

1. A testing device for measuring interfacial shear properties between fibers and media, comprising:

a main body, a mounting piece, and a fixing plate, wherein the main body is in a rectangular plate structure with L-shaped plates provided at both bottom ends of the main body, a connecting rod provided at a right side of a top of the main body, a groove provided at the top of the main body, four rotating grooves are provided inside the groove, the four rotating grooves are of cylindrical structures with raised middle of both ends, the mounting piece is installed above a left end of the main body, the fixing plate is installed above the right side of the main body through a round rod; the main body further comprises: a moving plate, the moving plate is in the rectangular plate structure, the top of the moving plate is provided with a T-shaped block, and the T-shaped block is coated with lubricating oil on an outer side, six round holes are provided on both sides of the moving plate with guiding rods inserted inside the round holes, four threaded holes are provided on both sides of the moving plate, and adjusting rods are inserted into the threaded holes by their tips; tension trolley, where the tension trolley is in a rectangular structure, with a T-shaped groove opened at the bottom of the tension trolley, and the T-shaped groove is inserted with the T-shaped block of the moving plate, the tension trolley is connected to a magnet of a displacement micrometer on the side, and the tension trolley is provided with a tension meter on its top left side, the tension meter is provided with a clamp on its side, the tension trolley is provided with a clamping block on the top right side, a traction rope is fixed inside the clamping block, and a loading bucket is connected to the right end of the traction rope;

wherein the mounting piece comprises a pressurizing mechanism, and the pressurizing mechanism is installed inside the mounting piece, the mounting piece is a rectangular structure with four rectangular rods connecting the middle of the mounting piece, and a T-shaped groove and four rectangular grooves provided at a top of the mounting piece, and a jack fixed at the top of the inside of the mounting piece; and wherein the fixing plate is a rectangular plate structure, the fixing plate comprises: a guiding wheel, the guiding wheel is provided with a round hole inside, the round hole is inserted with a moving rod, the guiding wheel is provided with the groove on an outer side, and the groove is embedded with a traction rope inside.

2. The testing device for measuring interfacial shear properties between fibers and media according to claim 1, wherein the main body comprises:
a supporting plate, wherein the supporting plate is a rectangular plate structure, with a rectangular groove provided inside the supporting plate, two triangular support plates are provided on both sides of a left end of the supporting plate, a displacement micrometer is installed on a right side of the supporting plate, and a bracket and a magnet are provided on a side of the displacement micrometer; mounting grooves, wherein the mounting grooves are of L-shaped structures, and the mounting grooves are opened on both sides of the groove of the main body.

3. The testing device for measuring interfacial shear properties between fibers and media according to claim 1, wherein the guiding rods are cylindrical structures, the guiding rods are provided with a total of six, and the guiding rod is mounted on both sides inside the groove of the main body; and
wherein the main body further comprises adjusting rods, the adjusting rods are cylindrical structures with both ends raised in the middles, bottoms of adjusting rods are provided with a controlling rod, tops of the adjusting rods are provided with threads on outer sides, and the adjusting rods are mounted inside the four rotating grooves of the groove.

4. The testing device for measuring interfacial shear properties between fibers and media according to claim 1, wherein the main body further comprises:
a bracket, wherein the bracket is U-shaped, the bracket is provided with wedge-shaped blocks on both sides at bottoms of both ends, the bracket is provided with L-shaped plates at the bottoms of both ends, and the L-shaped plates are inserted inside the mounting grooves; and
a high-definition camera, wherein the high-definition camera is fixed in a middle of the bottom of the bracket.

5. The testing device for measuring interfacial shear properties between fibers and media according to claim 1, wherein the mounting piece comprises:
a positioning groove, wherein the positioning groove is a T-shaped structure, and two sides of a front end of the positioning groove are of an inclined structure; and connecting plate, wherein the connecting plate is an L-shaped structure, the connecting plate is located on both sides of a right end of the mounting piece, and the connecting plate is inserted inside with a top of the supporting plate.

6. The testing device for measuring interfacial shear properties between fibers and media according to claim 1, wherein the pressurizing mechanism comprises:
a storage piece, wherein the storage piece is a T-shaped structure, a top interior of the storage piece is a rectangular structure, a right middle position of the storage piece is provided with a through groove, and a bottom of the storage piece is inserted into the interior of the positioning groove; and
a pushing piece, wherein the pushing piece is a rectangular structure, an interior of the pushing piece is connected by the four rectangular rods, and the four rectangular rods are inserted inside the four rectangular grooves at the top of the mounting piece, and the top interior of the pushing piece is provided with a T-shaped groove, and the top of the T-shaped groove is provided with a rectangular groove.

7. The testing device for measuring interfacial shear properties between fibers and media according to claim 1, wherein the mounting piece further comprises:
an inserter, wherein a bottom of the inserter is a T-shaped structure, a top of the inserter is a cylindrical structure with a raised center, the top of the inserter is equipped with a spring on an outer side, the bottom of the inserter is inserted inside the T-shaped groove at the top of the mounting piece; and an inserting plate, where the inserting plate is a T-shaped structure, a middle of the inserting plate is provided with a round hole, the top of the inserter is inserted inside the round hole, and the inserting plate is embedded inside the T-shaped groove of the pushing piece.

8. The testing device for measuring interfacial shear properties between fibers and media according to claim 1, wherein the fixing plate comprises:
a supporting block, wherein the supporting block is in a rectangular structure, a top of the supporting block is provided with a rectangular groove, the supporting block is located at a top of the fixing plate; and a guiding piece, wherein the guiding piece is a rectangular structure, the guiding piece is provided with the rectangular groove inside, the guiding piece is fixed in an inclined shape on both sides above a right end of the supporting block.

9. The testing device for measuring interfacial shear properties between fibers and media according to claim 1, wherein the moving rod is a cylindrical structure, two ends of the moving rod are provided with two round plates, the two ends of the moving rod are equipped with springs on the outer side, the outer end of the moving rod is inserted inside the rectangular groove of the guiding piece; and a contacting piece, wherein the contacting piece is a circular structure, the contacting piece is made of rubber, the contacting piece is installed on the two ends of the moving rod, and the outer side of the contacting piece is in contact with inner ends of the springs.

* * * * *